April 13, 1948.  S. E. IRWIN, JR  2,439,607
TREE FELLING AND LOG SAWING ATTACHMENT FOR TRACTORS
Filed June 7, 1944  4 Sheets-Sheet 2

INVENTOR
Samuel E. Irwin, Jr.
By Carlson, Pitzner, Hubbard & Wage
ATTORNEYS

April 13, 1948. S. E. IRWIN, JR 2,439,607
TREE FELLING AND LOG SAWING ATTACHMENT FOR TRACTORS
Filed June 7, 1944 4 Sheets-Sheet 3

INVENTOR
Samuel E. Irwin, Jr.
By Carlson, Pitzner, Hubbard & Wolfe
ATTORNEYS

April 13, 1948.  S. E. IRWIN, JR  2,439,607
TREE FELLING AND LOG SAWING ATTACHMENT FOR TRACTORS
Filed June 7, 1944  4 Sheets-Sheet 4
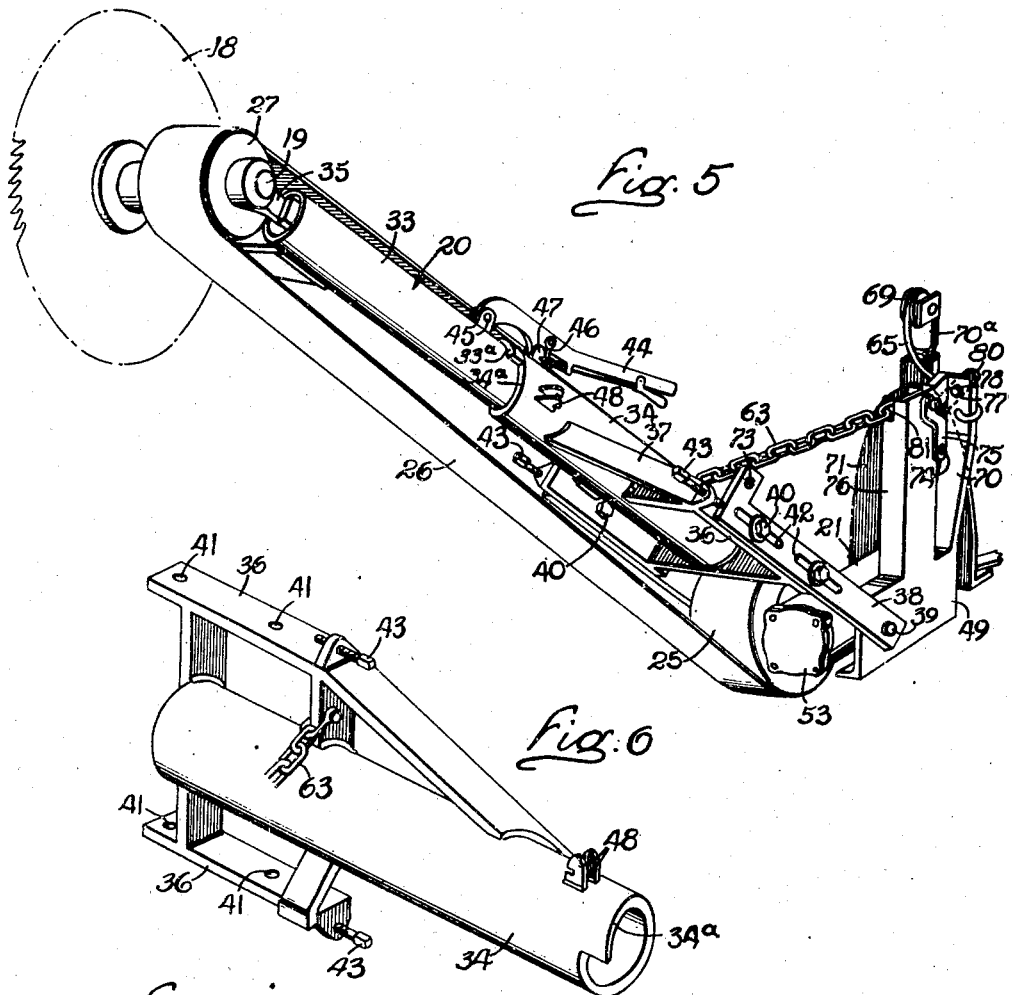
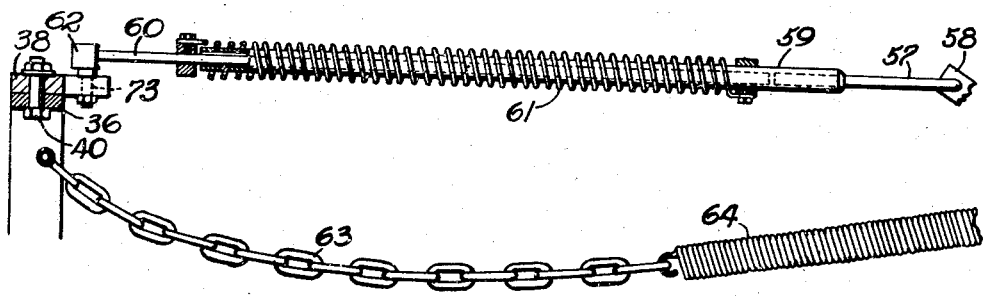
INVENTOR
Samuel E. Irwin, Jr.
By Carlson, Pitzner, Hubbard & Wolf
ATTORNEYS Patented Apr. 13, 1948

2,439,607

UNITED STATES PATENT OFFICE 2,439,607

TREE FELLING AND LOG SAWING ATTACHMENT FOR TRACTORS

Samuel E. Irwin, Jr., Ponta, Tex.

Application June 7, 1944, Serial No. 539,061

1 Claim. (Cl. 143—43)

The present invention pertains to a novel implement attachment for tractors, and more particularly to saw attachments for tractors.

One general object of the present invention is to provide a novel saw attachment for tractors, which attachment is of such character as to afford a high degree of versatility and freedom of movement for a circular saw powered from the tractor, to the end that the saw may be used optionally for cutting or mowing brush and light growth, felling trees, and cutting up felled trees or timbers.

In carrying out the foregoing object I provide a circular saw mounted on the outboard end of a long supporting arm adapted to project laterally from the rear end of a tractor. A more specific object of the invention is to provide such a mechanism embodying a novel arrangement for adjustably swinging the arm either vertically or fore and aft of the tractor's path of movement during use, as well as for, in effect, twisting the arm about its longitudinal axis to alter correspondingly the plane of the saw. The freedom of motion for the saw-supporting arm is thus comparable to that of a person's forearm.

A further object is to provide for tractors a novel saw attachment of such character as to make possible the utilization of a conventional power-operated lifter arm on the tractor for manipulating the saw as well as to utilize power derived from the tractor for revolving the saw.

As a more detailed object it is contemplated to couple the saw-supporting arm to the tractor lifting arm by means of a cable and to include improved stop means for limiting cable movement within a predetermined range.

The invention also resides in various novel combinations or sub-combinations of elements embodied in the mechanism, some of which are, as will be apparent to those skilled in the art, applicable to implements other than saws or to saw structures other than those peculiarly adapted for tractors.

Further objects and advantages of the invention will become apparent as the following description proceeds, taken in connection with the accompanying drawings in which:

Fig. 5 shows the saw attachment of Figs. 1 and 2 suspended in partially elevated position for use with a movable saw table or the like.

Fig. 6 is a detail perspective view of the inboard one of the coacting tubular sections comprised in the swingable supporting arm for the saw.

Fig. 7 is a fragmentary detail view, partially in section, showing the manual operating connector from the tractor to the swingable saw-supporting arm.

Figure 1:
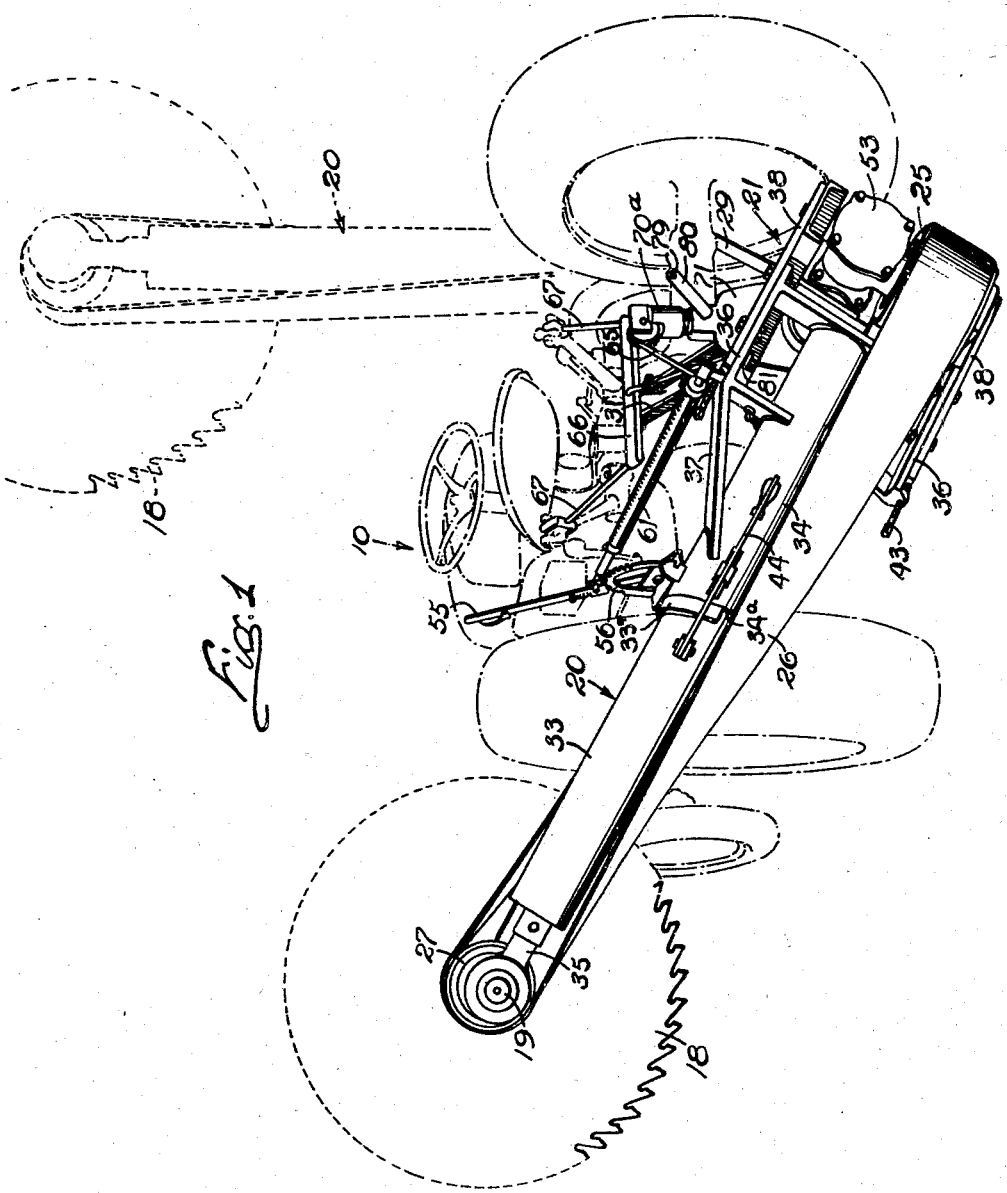
Figure 1 is a perspective view of a saw attachment embodying the present invention and shown as installed on the rear end of a tractor.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claim.

Referring more particularly to the drawings, the invention has, in the present instance, been exemplified as embodied in a saw attachment which is shown in Fig. 1 as applied to a tractor 10. The tractor itself may, of course, take a variety of forms and has been indicated herein, simply for purposes of exemplification, as having the outline of a familiar commercial type. For use with the form of implement shown, the tractor is desirably such as to afford a rear end power take-off as well as a power-operated lifter arm or arms, the former being used in revolving the saw and the latter in manipulating it.

Figure 2:
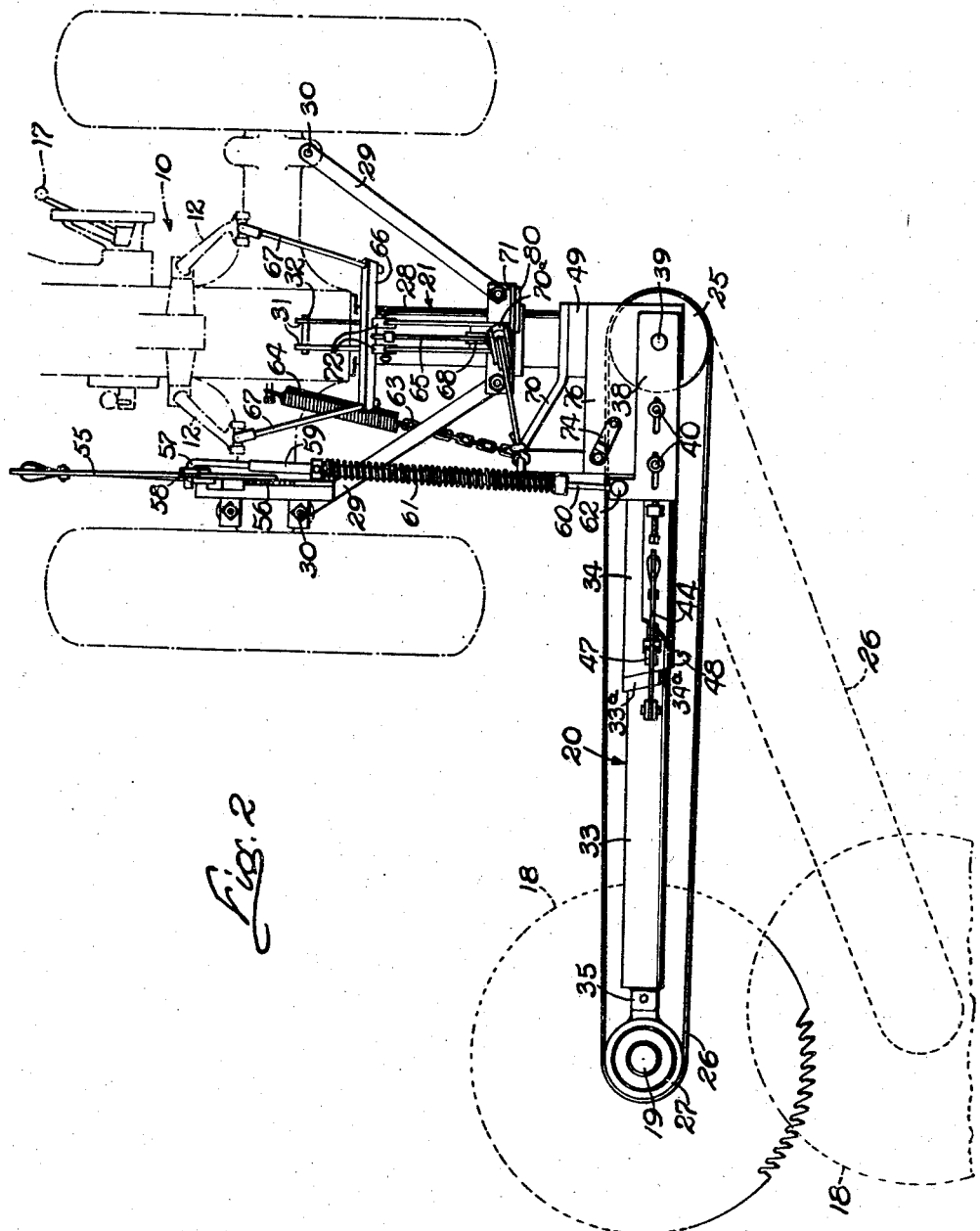
Fig. 2 is a plan view of the saw attachment of Fig. 1 but with the saw blade shown as adjusted to lie in a horizontal plane as distinguished from the vertical plane location of the same in Fig. 1.
Figure 3:
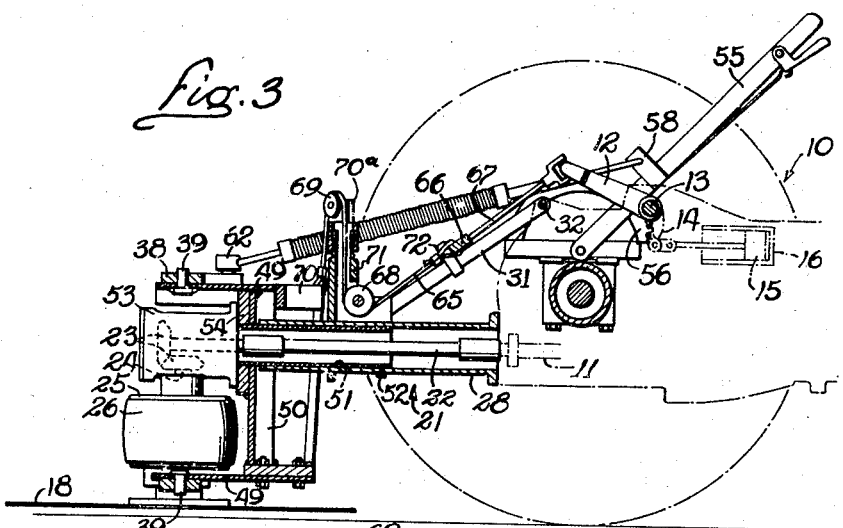
Fig. 3 is a side elevation of the attachment shown in Fig. 1 and with the same partially in vertical section along the longitudinal axis of the drive shaft from the rear end of the tractor.

As best shown in Fig. 3, the tractor 10 herein indicated has a power take-off shaft 11, the same being located at the rear end of the tractor (within the lower portion of the differential housing) and driven from the tractor engine in the usual manner, through connections and a suitable control clutch which are not shown since the same constitute well-known and conventional tractor equipment. The auxiliary power or lifter arm unit on the tractor may take a variety of forms and, as illustrated herein, may, simply by way of example, be of the construction disclosed in some detail in H. F. Ferguson Patent No. 2,118,180, issued May 24, 1938. Since the construction and operation of such units is well understood, the same need not be detailed here. For the present, suffice it to say that a pair of lifter arms 12 (Figs. 1 and 3) are fixed to a horizontal shaft 13 journaled on the upper rear portion of the tractor and connected by a linkage 14 with the piston 15 of a hydraulic ram 16. Pressure fluid may be admitted to or exhausted from the ram under the control of a manual control lever 17 (see Fig. 2) on the tractor. Upon admission of pressure fluid to the ram the arms 12 are swung upward, whereas exhausing of pressure fluid from the ram permits the arms to move downward under the influence of the weight of the mechanism attached to them.

As to the saw attachment itself, and which constitutes the illustrated embodiment of the present invention, it has been shown (Fig. 1) as including a large, heavy-duty circular saw 18 fixed on one end of a revoluble saw arbor 19. The outer face of the saw is prefectly flat. The arbor 19 is journaled transaxially in the outboard end of a swingable supporting arm designated generally as 20. The inboard end of this arm is connected to the trailing end of a support, designated generally as 21, detachably secured to the rear end of the tractor 10, the connection of the arm being such that it may be swung not only in a vertical direction as indicated in Fig. 1, but also fore and aft of the tractor's path of movement as indicated in Fig. 2. In other words, the arm 20 has substantially a universal movement.

Power for rotating the saw is transmitted from the power take-off shaft 11 (Fig. 3) through a drive shaft 22, detachably coupled at its forward end to the projecting rear end of the power takeoff shaft 11. At its opposite or rear end the drive shaft 22 is connected through a pair of meshing bevel gears 23 to a stub shaft 24 carrying a pulley 25 at the inner end of the arm 20. The latter is connected by an endless belt 26 with a pulley 27 fixed to the saw arbor 19 at the opposite or outer end of the arm 20. As shown clearly in Figs. 2 and 5, the pulleys 25, 27 are of such diameter and so arranged with respect to the arm 20 that the belt 26 when in its normal or untwisted position lies closely adjacent and parallel to the arm along its entire length. With the parts arranged as shown, the arm 20 therefore provides a large measure of protection, tending to prevent debris and underbrush from being drawn between the belt and the pulleys. The inclusion of a belt, as such, in the drive connections to the saw is desirable in that slippage in the drive connection is thus permitted in the event that the saw jams during operation.

With reference to further detail of the parts referred to generally above, it will be observed upon reference to Figs. 2 and 3 that the support 21 comprises a tubular housing 28 having a flanged forward end rigidly, although detachably, fixed to a suitable face provided on the differential housing at the rear end of the tractor. The housing 28 projects generally horizontally from the rear end of the tractor and the drive shaft 22 extends axially through it. Diagonal struts 29 brace the housing 28 laterally, the forward ends of these struts being bolted to the rear axle housing of the tractor as, for example, by the bolts 30 which may also serve to secure the rear wheel mud guards (not shown) in position. The housing 28 is braced vertically by a parallel pair of struts 31 inclined forwardly and upwardly and having their upper ends bolted at 32 to a lug on the upper side of the differential housing. It will be noted, incidentally, that the linkage shown in the Ferguson Patent No. 2,118,180 referred to above, and normally operated by the hydraulic lifter arms 12, has been omitted in the present instance.

The swingable supporting arm 20, on the other hand, consists of a plurality of sections in order to facilitate the solution of various belt tensioning problems, as well as to accommodate twisting of the arm (about its longitudinal axis) for altering the plane of the saw blade 18. In the present instance the arm 20 is shown (Figs. 1, 2 and 5) as including a pair of axially aligned tubular sections or members 33, 34, the inner end of the section 33 being telescoped within the adjacent end of the inboard section 34. The bearings for the saw arbor 19 are carried by a bar 35 fixed in the outer end of the tubular section 33. A third or inner end section of the arm 20 is extensible in character and in this instance comprises a rectangular frame 36 (see also Fig. 6) welded to the tubular section 34 and having a diagonal brace 37 also fixed to the latter. The extensible section of the arm 20 also includes a pair of jaws 38 pivoted on pins 39 (see also Fig. 4) to swing about an axis coincident with the axis of the pulley 25 and slidably receiving between them the frame 36. The latter frame is adjustably secured to the coacting jaws 38 by bolts 40 (Figs. 2 and 5) which pass through holes 41 in the frame (Fig. 6) and registering slots 42 (Figs. 4 and 5) in the jaws 38.

To adjust the tension of the belt 26 the operator has only to loosen the bolts 40 and slide the frame 36 longitudinally of the jaws 38 in a direction to either increase or decrease the belt tension as may be desired, and thereafter retighten the bolts. Adjusting screws 43 (Fig. 5) threaded in suitable lugs provided on the frame 36 and disposed with their noses bearing against the ends of the jaws 38 are provided to facilitate such adjusting movement.

Twisting of the supporting arm section 33 relative to the section 34, which telescopingly engages it, is utilized in altering the plane of the saw blade 18. For some cutting operations it may be desirable to locate the blade horizontally as shown in Figs. 2 and 3; whereas in other instances it may be desirable to locate the blade in a vertical plane as indicated in Figs. 1 and 5. If desired, a lever 44 (Fig. 5) may be pivotally connected to the arm section 33 at 45 to aid in manipulating the arm section 33 when making such adjustment. A spring-urged latch 46 on the lever 44 is arranged for alternative engagement with two pairs of notched lugs 47, 48 displaced from each other substantially ninety degrees about the periphery of the non-rotatable arm section 34. The latch and lugs thus serve to locate and retain the arm in corresponding ones of its two alternatively available positions of angular or twisting adjustment.

Provision is made for automatically retaining the tension in the belt 26 substantially constant (at the value preset by adjustment of parts 36, 38 relative to each other) throughout the twisting of the belt incident to twisting of the arm section 33 relative to section 34. For that purpose the end 34a of the section 34 is shaped in spiral form and a complementally spiraled strap 33a is welded to the section 33 and presents an edge as a shoulder against which the end 34a bears. The abutting surfaces of 33a and 34a thus cam the section 33 longitudinally outward as such section is turned in a direction which would otherwise relieve the belt tension. Similarly, when the section 33 is turned in the opposite direction, thereby tending to increase the belt tension, the abutting spiraled surfaces of 33a, 34a permit the section 33 to move toward the section 34 so that the tendency to increase belt tension is compensated. At all times the tension in the belt pulls the member 33 axially inward, retaining the edge of strap 33a in engagement with the complementally shaped end 34a of the section 34.

The pivotal mounting of the saw-supporting arm 20 on the pins 39 for fore and aft swinging motion of the arm has been heretofore noted. In addition, provision is made for pivoting the arm about the axis of the drive shaft 22 so that it may swing generally vertically or, in other words, have, altogether, substantially a universal motion relative to the rear end of the tractor. For such purpose the pivot pins 39 are fixed to respective ones of a pair of bracket arms 49 (Figs. 3 and 4) rigidly joined by a frame 50. The frame 50 is, in turn, secured to a sleeve 51 telescoped within the tubular housing 28 and rotatable therein, although held against axial displacement by a dog screw 52. A housing 53 for the gearing 23 is bolted to a pad 54 fixed to the frame 50. The frame 50, housing 53, bracket arms 49 and sleeve 51 are thus all adapted to swivel as a unit about the horizontal axis of the drive shaft 22 upon turning of the sleeve 51 within the housing 28.

Both vertical and fore and aft motion of the saw-supporting arm 20 are controllable by the tractor driver from his seat on the tractor. Desirably the vertical motion (about the axis of the drive shaft 22) is accomplished principally by power derived from the hydraulically-operated lifter arms 12 on the tractor in view of the weight which must be manipulated. The fore and aft motion may, on the other hand, be accomplished simply by manual operation. For the latter purpose a hand lever 55 having a quadrant 56 is pivoted on a sub-base detachably secured to the rear axle of the tractor and positioned to be readily available to the operator (Figs. 1, 2 and 3). This lever 55 swings fore and aft of the tractor and is connected to an intermediate portion of the swinging saw-supporting arm 20 by a connection which is preferably yieldably extensible. In the present instance such connection is shown (see Figs. 2 and 7) as including a rod 57 pivotally connected at its forward end to a lug 58 on the lever 55 and having its rear end fixed to a sleeve 59. A second rod 60 is telescoped within this sleeve 59 and its forward end positioned to abut solidly against the end of the rod 57 when thrust against the same. A contractile spring 61 encircles the sleeve 59 and is anchored at its opposite ends to the sleeve 59 and to the rod 60. The outer end of the latter rod 60 is pivotally connected at 62 to the upper one of the jaws 38 (see also Fig. 4). Whenever the saw 18 encounters an obstruction the spring 61 permits some yield so that the shock of impact is cushioned. A safety chain 63 and tension spring 64 (Fig. 2) are anchored, respectively, to the tractor and to a frame 36 of the arm 20 (see also Fig. 6) so as to limit the rearward swing of such arm 20 and the load imposed on the spring 61.

Vertical swinging motion is imparted to the saw-supporting arm 20 about the axis of the drive shaft 22 by power derived from the hydraulic lifter arms 12 through the use of a cable 65 (Figs. 1 and 2). The forward end of such cable is anchored to a cross bar 66 connected at its opposite ends to a pair of links 67 depending from the lifter arms 12. The cable 65 is led under a pulley 68 journaled on the upper side of the housing 22 (see also Figs. 3 and 4) and thence up over a pulley 69, its opposite end being anchored to a reenforced bracket 70 fixed to the frame and bracket arm structure 49, 50. The upper pulley 69 is journaled in a cap 70a (Figs. 1 and 3) threaded on the upper end of an upright standard 71 for free swiveling motion. The standard 71 is rigid with the housing 28 and is hollow, the cable being led up through it. As the hydraulic lifter arms 12 are swung upward, the cable 65 is pulled forward, thus swinging the saw-supporting arm 20 upward. Conversely, when the hydraulic pressure in the ram 16 is relieved so that the lifter arms 12 may descend, the weight of the saw and its supporting arm 20 causes it to swing downward, retaining the cable 65 taut. Stop lugs 72 (Figs. 2 and 3) are adjustably fixed to respective ones of the braces 31 in position to intercept the bar 66 as the latter moves downward during descent of the saw-supporting arm 20, thus limiting such downward movement of the arm to any desired stopping point determined by the setting of the stop lugs 72.

Figure 4:
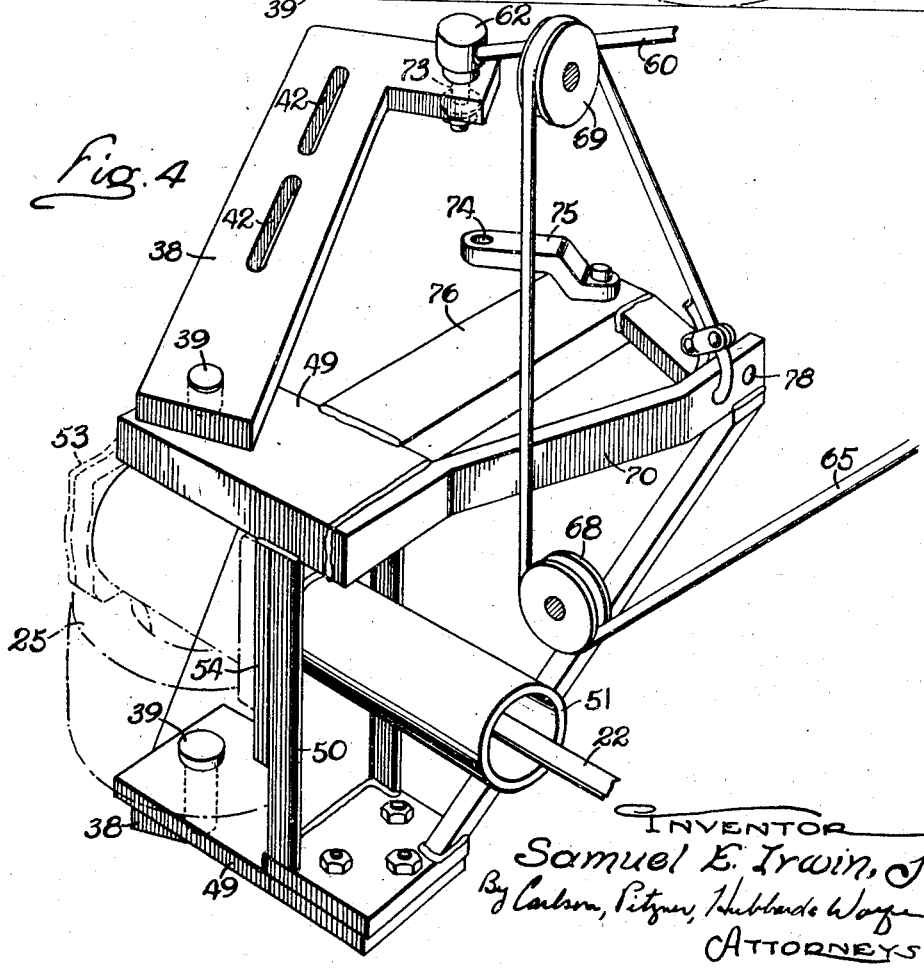
Fig. 4 is an enlarged detail perspective view of the mechanism for swingably connecting the saw-supporting arm to the stationarily mounted support on the rear end of the tractor.

For transport purposes the saw-supporting arm 20 is desirably positioned vertically as indicated in dotted lines in Fig. 1. It is raised to such upright position by hand and in such case the cable 65 is slacked off. To condition the arm for lifting of the same into such transport position, the connecting pin 62 for the operating rod 60 is removed from the hole 73 in the jaw 38, thus disabling the connection from the lever 55. Thereafter the operator manually swings the arm 20 into upright position and locks it against falling rearwardly from such position by passing a pin (not shown) through the hole 73 and a hole 74 in a link 75 pivoted on an upright arm 76 rigid with the frame and bracket assembly 49, 50 (Figs. 4 and 5). To lock the arm 20 against falling sideways a pin 77 (Fig. 5) is inserted not only through hole 78 in the arm 70, but also through the registering hole 79 (Fig. 1) in a bar 80 welded on the standard 71.

The operation of the saw attachment will in general be clear from the foregoing. By way of recapitulation, it may be assumed, first of all, that the operator wishes to cut brush or other light growth as, for example, in clearing pasture land. In such case the stop lugs 72 are located to intercept the descent of the bar 66 when the arm 20 and the saw 18 are in horizontal position, or in some slightly elevated position, depending upon how closely the growth is to be cropped. The operator moves the control lever 17 to relieve hydraulic pressure on the ram 16 and the arm 20 descends to the preset position determined by the stop lugs. The drive to the power take-off shaft 11 is engaged and thereafter the saw 18 may be allowed to run continuously. The operator then drives the tractor forward with the saw running, cutting down the growth as it goes, more or less in the manner of a mower. Upon coming to a boulder or similar obstruction, the operator has only to move the control lever 17 to raise the saw clear by power, the arms 12 rising and drawing in the cable 65 to lift the arm 20. Restoration of the control lever 17 to its off position permits the arm 20 to lower back to its previous working position as limited by the stop lugs. As the saw 18 cuts its way through the growth which it encounters, any sudden shocks of impact against small tree trunks, etc., are absorbed by the spring 61, the yield of the latter permitting the arm 20 to drop to the rear slightly. Such rearward swing is, however, limited by the normally slack safety chain 63 and heavy spring 64.

To alter the angle at which the arm 20 projects, the driver has only to move the hand lever 55 to shift such arm accordingly. Such control is, moreover, particularly useful in felling large trees, that is, those too large to be downed when the tractor is moving along steadily and the saw acting more or less as a mower. When such a large tree is to be cut, the driver halts the tractor near it with the edge of the saw 18 presented to the trunk. Then by moving the lever 55 he feeds the saw 18 slowly through the trunk, swinging the arm 20 horizontally to do so. Should the tree be so large as to require it, the tractor can be shifted and more than one pass taken with the saw.

For cutting up or sectioning a felled tree or performing a similar sawing operation, the tractor is driven up alongside the tree and stopped. The operator grasps the adjustment lever 44, releases the latch 46 from the lugs 47 and twists the saw-supporting arm section through ninety degrees, thereafter locking it in its new position by engaging the latch with the other pair of lugs 48. The saw blade 18 is thus turned to the vertical position of Fig. 1. The arm 20 is elevated to locate the saw above the log to be cut and thereafter the revolving saw is lowered into contact with the log. For the latter purpose the operator moves the control lever 17, exhausting pressure fluid from the ram so that the lifter arms 12 are permitted to descend slowly under the weight of the saw and arm 20. As the saw cuts its way through the log it continues its descent. The stop lugs 72 are preset to arrest such descent before the saw works its way into the ground.

The saw attachment can also be conditioned for use in sawing up logs, lumber or the like on a suitable saw table. For that purpose the operating connector rod 60 is disengaged from the arm 20 and the latter is swung to project generally longitudinally rearwardly of the tractor. Moreover, the arm 20 is suspended in an upwardly inclined position (Fig. 5) to locate the saw 18 above the table or the like (not shown). To suspend the arm in such position the safety chain 63 is unhooked from the spring 64 and engaged in a notch 81 in the arm 76, the latter being upright at such time.

For transport the saw is stopped, the connection rod 60 is disconnected, and the arm 20 swung up by hand into vertical position where it is locked as heretofore described.

Removal of the implement from the tractor for substitution of some other implement is, as will be readily perceived, a simple matter. The connection rod is disconnected from the arm 20 and the sub-base for the hand lever 55 unbolted from the tractor axle to demount it. The braces 29, 31 are also unbolted from the tractor, as is the housing 28, and the drive shaft 22 disconnected from the power take-off shaft 11. Disconnection of the cable 65 is also made. The implement is thus completely freed from the tractor and may be stored until the next occasion for its use arises. The adjustment of the stops 72 is in no way affected by such removal.

I claim as my invention:

In a saw attachment for a tractor having a vertically swingable lifter arm pivoted thereon for powered elevation and alternative lowering under load upon removal of the application of power thereto, the combination of an elongated arm having a circular saw journaled on the outer end thereof, means pivotally connecting the inner end of said arm to the rear portion of the tractor for generally universal swinging motion with reference thereto, a flexible cable, means for detachably connecting said cable to the lifter arm on the tractor, means for connecting said cable to said arm for raising of the latter upon raising of the lifter arm, a stop supporting member arranged longitudinally along the path of movement of said cable and means including a stop adjustably positionable along said stop supporting member engageable with a coacting abutment fixed to said cable and movable therewith for positively limiting the movement of said cable in the direction of its movement for descent of said arm.

SAMUEL E. IRWIN, Jr.

REFERENCES CITED

The following references are of record in the file of this patent:

UNITED STATES PATENTS

| Number | Name | Date |
| --- | --- | --- |
| 142,611 | Carothers | Sept. 9, 1873 |
| 594,729 | Crosby | Nov. 30, 1897 |
| 827,548 | Martin | July 31, 1906 |
| 972,517 | Diamond | Oct. 11, 1910 |
| 1,126,312 | Strauss | Jan. 26, 1915 |
| 1,316,743 | Roche et al. | Sept. 23, 1919 |
| 1,318,324 | Keon | Oct. 7, 1919 |
| 1,447,543 | Gessman | Mar. 6, 1923 |
| 1,473,536 | Avery | Nov. 6, 1923 |
| 1,564,382 | Treiman | Dec. 8, 1925 |
| 1,602,357 | Georgelis | Oct. 5, 1926 |
| 1,691,581 | Mueller et al. | Nov. 13, 1928 |
| 1,712,291 | Byrne | May 7, 1929 |
| 1,798,402 | Dibble | Mar. 31, 1931 |
| 1,824,555 | Lathers | Sept. 22, 1931 |
| 1,832,599 | Wilhelm et al. | Nov. 17, 1931 |
| 2,050,952 | Jacques | Aug. 11, 1936 |
| 2,118,180 | Ferguson | May 24, 1938 |
| 2,216,971 | Farmer | Oct. 8, 1940 |
| 2,310,152 | Ronning | Feb. 2, 1943 |
| 2,312,287 | Renner | Feb. 23, 1943 |
| 2,330,996 | Rivers | Oct. 5, 1943 |
| 2,350,880 | Dellinger et al. | June 6, 1944 |
| 2,354,095 | Adams | July 18, 1944 |
| 2,354,625 | Van Sickle | July 25, 1944 |

FOREIGN PATENTS

| Number | Country | Date |
| --- | --- | --- |
| 27,542 | Sweden | Oct. 16, 1909 |
| 101,436 | Australia | June 24, 1937 |